US012610087B2

(12) United States Patent
Porat et al.

(10) Patent No.: US 12,610,087 B2
(45) Date of Patent: Apr. 21, 2026

(54) CODING TREE-BASED ADAPTIVE QUANTIZATION

(71) Applicant: Nvidia Corporation, Santa Clara, CA (US)

(72) Inventors: Dror Porat, Haifa (IL); Dotan David Levi, Kiryat Motzkin (IL); Limor Martin, Givatayim (IL); Vipul Parashar, Pune (IN); Yogender Gupta, Bengaluru (IN); Sampurnananda Mishra, Pune (IN); Jianjun Chen, Shanghai (CN)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 18/637,165

(22) Filed: Apr. 16, 2024

(65) Prior Publication Data

US 2025/0310572 A1 Oct. 2, 2025

(30) Foreign Application Priority Data

Mar. 27, 2024 (WO) ................ PCT/CN2024/084088

(51) Int. Cl.
| | |
|---|---|
| *H04N 19/86* | (2014.01) |
| *H04N 19/103* | (2014.01) |
| *H04N 19/147* | (2014.01) |
| *H04N 19/176* | (2014.01) |
| *H04N 19/80* | (2014.01) |
| *H04N 19/96* | (2014.01) |

(52) U.S. Cl.
CPC ........... *H04N 19/86* (2014.11); *H04N 19/103* (2014.11); *H04N 19/147* (2014.11); *H04N 19/176* (2014.11); *H04N 19/80* (2014.11); *H04N 19/96* (2014.11)

(58) Field of Classification Search
CPC .... H04N 19/86; H04N 19/103; H04N 19/147; H04N 19/176; H04N 19/80; H04N 19/96
USPC ...................................... 375/240.29
See application file for complete search history.

(56) References Cited

U.S. PATENT DOCUMENTS

| | | | | | |
|---|---|---|---|---|---|
| 5,367,629 | A | * | 11/1994 | Chu | H04N 19/61 |
| | | | | | 375/E7.113 |
| 6,335,990 | B1 | * | 1/2002 | Chen | G06T 5/20 |
| | | | | | 382/265 |
| 2003/0039310 | A1 | * | 2/2003 | Wu | H04N 19/139 |
| | | | | | 375/E7.181 |
| 2005/0036549 | A1 | * | 2/2005 | He | H04N 19/172 |
| | | | | | 375/E7.176 |
| 2006/0045181 | A1 | * | 3/2006 | Chen | H04N 19/117 |
| | | | | | 375/240.12 |

(Continued)

FOREIGN PATENT DOCUMENTS

WO WO-2025012032 A1 * 1/2025 ............. H04N 19/87

*Primary Examiner* — Behrooz M Senfi
(74) *Attorney, Agent, or Firm* — Hogan Lovells US LLP

(57) ABSTRACT

Systems and methods herein are for a video encoder to be associated with a temporal filter and a coding tree and that can perform a main pass for video encoding using individual video blocks towards prediction of at least one frame associated with the media stream, where the coding tree is associated with a lookahead pass, and where the temporal filter can enable denoising within the lookahead pass to reduce an effect of noise in one or more of motion estimation or mode selection of the video encoding.

20 Claims, 7 Drawing Sheets

(56) References Cited

U.S. PATENT DOCUMENTS

2009/0086816 A1 * 4/2009 Leontaris ............... H04N 19/14
                                                375/E7.193
2015/0381979 A1 * 12/2015 Michelsen ........... H04N 19/137
                                                375/240.29
2021/0306640 A1 * 9/2021 Tanner ................. H04N 19/176

* cited by examiner

200

Application
204

Control input
208

Input
Sequence
102

Input
Sequence
102

Processed Sequence
202

Encoder 104

Coding Tree 128

Prior/Ref.
frames
106

Main Pass
118A

MPoutput

Temporal Filter
130

Denoising
206

Lookahead
pass 118B

LPoutput

Output Bitstream
126

Input Sequence 102

102A     102B

Denoising 206

Coding Tree 128

Main Pass 118A

Lookahead Pass 118B

Intra, Inter, Prediction + Noise 302

Intra, Inter, Prediction 304

Stats Call 310

Stats Returned 312

MPoutput

LPoutput 306     308

PERFORM THE TEMPORAL FILTER AND THE CODING TREE BY SEPARATE FEATURES OF THE VIDEO ENCODER ⎯ 602

OUTPUT RECEIVED? ⎯ 604

N

Y

USE THE OUTPUT OF THE CODING TREE FOR THE MODE SELECTION OF STEP 510 ⎯ 606

ENABLE A RATE DISTORTION OPTIMIZATION (RDO) FEATURE OF THE VIDEO ENCODER TO APPLY THE MODE SELECTION ⎯ 608

600

CODING TREE-BASED ADAPTIVE QUANTIZATION

CROSS-REFERENCE TO RELATED APPLICATIONS

This application is related to and claims the benefit of priority to PCT Application Serial No. PCT/CN2024/084088 filed Mar. 27, 2024, and entitled "CODING TREE-BASED ADAPTIVE QUANTIZATION," which is incorporated by reference herein in its entirety and for all intents and purposes.

TECHNICAL FIELD

At least one embodiment pertains to improving media compression in coding tree-based quantization.

BACKGROUND

Video compression can be used to provide reduced media streams while preserving detail, to an extent, of content of an underlying video. However, such video compression may still require many parameters for tuning, to determine and limit operation of the video compression, for instance. A substantial part of the parameters provide different effects on different video. For example, one parameter may be used to improve a quality or to reduce a bitrate in part of a video being compressed. However, such one solution plan may have negative effects for different kinds of content as the one solution may not suit the content under compression. While an approach may be to leave selection of parameters to users of the video compression, such as by an input to a configuration for the video compression, most users may not be informed about a relation between a video sequence of the content and available parameters to provide any benefit to the video compression. For example, a user may not be able to determine if there will be a positive or a negative impact using a parameter of the video compression and temporal noise between frames may be included by a video encoder during a compression process.

DETAILED DESCRIPTION

Figure 1:
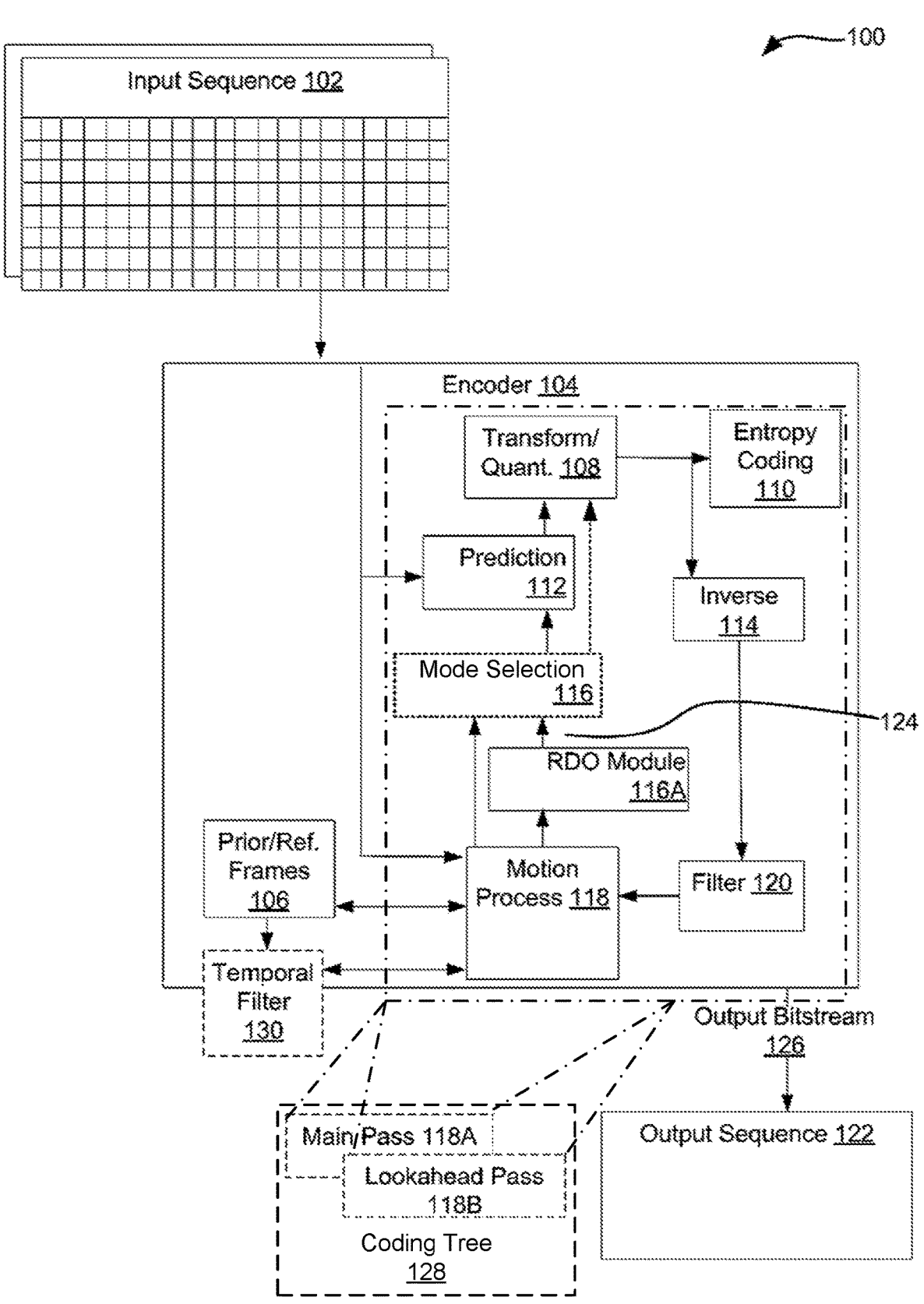
FIG. 1 is an illustration of a system for improving compression using a coding tree-based adaptive quantization, in at least one embodiment.

FIG. 1 is an illustration of a system 100 for improving compression using a coding tree-based adaptive quantization, in at least one embodiment. A coding efficiency of an encoder 104, such as video encoder, can be improved to address video compression and temporal noise between frames using algorithms for adapting a quantization parameter (QP) of the different blocks in an encoded frame during compression. In one example, a coding tree may be a feature used for mode selection to adapt the QP. The coding tree may include a Coding Unit tree (CU-tree) of an HEVC® (H.265®) encoding standard or a Macroblock tree (MB-tree) of an AVC®/H.264® encoding standard. The coding tree may include a superblock (SB) tree of certain encoding standards, in at least one embodiment. However, other dual pass encoding schemes may also benefit from the approaches herein to adapt the QP. In at least one embodiment, such a coding tree may include a main pass and a lookahead pass. The coding tree may be used to cause a decrease in the QP of a block if it is heavily referenced by future blocks or may cause an increase in the QP of a block if it is less referenced by future blocks. However, the use of the coding tree may be adversely affected by noise presence in a media stream. For example, the influence by the QP may be affected by the noise, which may include any type of signal degradations. As such, sub-optimal decisions based solely on the coding tree may be likely.

The adaptations to the QP herein can improve coding efficiency of an encoder 104 that uses a coding tree or other dual pass encoding schemes. For example, the adaptations to the QP may be towards determining the QP entirely based on removal or attenuation of noise or other degradations present in the media stream that includes an input sequence 102 of frames. This enables an improvement to decision making or mode selection, for instance, that may be made by an outcome of using the coding tree. In one example, the adaptations to the QP herein may be by processing or filtering noise in the lookahead pass so that QP provided from the lookahead pass may be used to modify a QP of a main pass. As the lookahead pass is based on future frames, relative to the main pass, a benefit is realized early on in compression of the media stream from noise present elsewhere in the media stream.

In at least one embodiment, a temporal filter 130 may be associated with the encoder 104 by being part of the encoder 104 or by providing an input to the encoder 104. The temporal filter is able to filter at least some frames of the input sequence 102. For example, the temporal filter is able to provide a reference frame denoising, such as a keyframe denoising, to reduce the amount of noise on one or more of a motion estimation or mode selection of the video encoding performed using the main pass on the media stream. The denoised future frames may be employed in a coding tree 128, prior to the denoised future frames being processed in the lookahead pass 118B. This may be ongoing, in parallel, with a main pass 118A performing its processing on other frames that are not the future frames, in at least one embodiment. Considerable coding gains are achieved in this process. The coding gains are reflected by improved coding efficiency or rate-distortion performance relative to a threshold, wherein the threshold is obtained using a reference compression having only the main pass performed on the media stream. Therefore, a combination of the temporal filter 130 and coding tree 128 in dual pass encoding can surpass other measures of gains, such as a sum of individual gains from using each of different coding tree-based algorithms otherwise used.

In at least one embodiment, therefore, the system 100 includes at least one circuit to perform as an encoder 104, which may be a video encoder to provide the coding tree-based adaptive quantization. Compression performed by the encoder 104 herein includes or is associated with a main pass 118A of a coding tree 128 that also supports a lookahead pass 118B. The lookahead pass 118B herein may perform estimations of encoding costs of different frames, different parts of frames, or different types of frames than the main pass 118A, which is detailed further in at least FIG. 3. The lookahead pass may generate statistics, including for statistics associated with bit costs, pixel values, or other coefficients for individual blocks of future frames of an input sequence. In one example, the different frames may be future frames that are not part of the main pass presently being processed but that will be processed for compression over time. There may be different estimations associated with the lookahead pass, as a result, including B-frame determinations, weighted predictions, and bit distributions. In another example, the different types of frames processed by the lookahead pass, relative to the main pass, may be different resolutions, downsampled versions, or proxy versions of at least a frame that is also processed or to be processed by the main pass. Further, the different estimations in the lookahead pass may be limited so as to perform faster determinations than the main pass.

In at least one embodiment, the lookahead pass 118B herein may be subject to input from a temporal filter 130 for denoising therein so that encoding decisions of the encoder 104 ultimately have reduced noise-based interdependencies between frames. For example, the frames used with the lookahead pass 118B may have noised removed therefrom, relative to frames used in the main pass 118A. As a result, the coding tree 128 herein may be seen as subject to denoising in at least the lookahead pass. In at least one embodiment, the denoising is to reduce an effect of noise on one or more of a motion estimation or mode selection of the video encoding performed by the main pass. Then, bit distribution that is based in part on an output of the lookahead pass, which may include adaptive QPs, as a result of such denoising, that can ensure bit savings on modes selected for compression while maintaining quality of the media stream. Therefore, the system 100 herein offers adaptive quantization using the coding tree 128 so that mode selection in aspects of the video compression provides bit savings that are substantially higher than bit rate savings associate with a threshold. The threshold may, in turn, be associated with a reference compression having only the main pass performed on the media stream. In at least one embodiment, it is possible to activate or deactivate the lookahead pass, in a video encoder, at different times.

In one example, the encoder 104 of FIG. 1 may include a motion process module 118 to provide the motion estimation and may include other processing modules 108-116, 120 for prediction, mode selection, RDO, and other processes that may be associated with one or more of a main pass 118A or a lookahead pass 118B. For example, each of the processing modules may be used in the main pass but may be also used in the lookahead pass, although with respect to different frames of an input sequence 102. Further, the main pass 118A and the lookahead pass 118B may be associated with the coding tree 128. Still further, the encoder 104 may be a singular circuit or may include one or more circuits capable of video encoding. The one or more circuits may include graphical processing units (GPUs) that may include kernel code for a temporal filter and a coding tree. The kernel code is also provided to perform other ones of the processing modules of the video encoding herein, including for motion estimation of a media stream.

The coding tree is able to provide adaptive QPs for individual video blocks that may be macroblocks (MBs), of one or more frames in a media stream. The adaptive QPs may be associated with prediction of at least one frame associated with the media stream. For example, the coding tree may be applied to a subset of a group of frames or pictures (GoF or GoP, which is used interchangeably herein) that may include the input sequence 102 as part of a media stream. The main pass 118A may apply to current or reference frames, along with a few frames ahead of the current frame, whereas the lookahead pass 118B may be directed to future frames that are further along in a same subset or a future subset of the GoF presently processed by the main pass 118A.

Therefore, the encoder 104 herein uses a coding tree 128 to perform the lookahead pass 118B in parallel with a main pass 118A. The encoder 104 may include a kernel code to a temporal filter 130 or may be associated with a temporal filter 130 that is a separate circuit that may be external to the encoder 104 but that receives frames associated with the input sequence 102. The frames may be a same subset or a future subset of the GoF presently processed by the main pass 118A. In at least one embodiment, the coding tree 128 may be used to process the GoF in the main pass to determine temporal noise from interdependencies between frames of the GoF. The temporal filter can use the temporal noise from the main pass to perform denoising within the lookahead pass. However, in at least one embodiment, temporal noise from future frames of the GoF itself may be used in the temporal filter to perform the denoising for the lookahead pass.

Figure 3:
FIG. 3 is an illustration of aspects of improving compression using a coding tree-based adaptive quantization, in at least one embodiment.

The temporal filter 130 is able to reduce an effect of the noise on one or more of the motion estimation or the mode selection, as described further with respect to at least FIG. 3 herein. In at least one embodiment, the system 100 herein can use the temporal filter 130 to provide denoising for future or other frames to be used with a lookahead pass of the coding tree 128. This can reduce an effect of the noise that may otherwise be associated with parameters used in a compression performed by the encoder 104. For example, the reduction in the effect of the noise in the compression may be made possible by subsequent mode selection in aspects of the compression. As the mode selection may be based in part on quantizer deltas of the QPs from the coding tree, the mode selection may be such that noise between frames may be reduced. This improves a bit rate savings over a threshold, such as a threshold that may be associated with a reference compression that uses only the main pass.

In at least one embodiment, the system 100 is also enabled, using the encoder 104, to use default video compression parameters, reflecting the different encoding parameters that may be based in part on mode selection influenced by the denoised lookahead pass of the coding tree. The system 100 is also enabled, using the encoder 104, to perform video compression or encoding that is devoid of some or all of the default video compression parameters based in part on mode selection influenced by the denoised lookahead pass of the coding tree. The video compression parameters are also referred to herein as encoding parameters. In at least one embodiment, the encoding parameters herein may be selected by the adaptive quantization using the coding tree herein.

FIG. 1 also illustrates that, in aspects of video encoding, a mode selection may be made to perform inter or intra mode coding, among other encoding options. Such a mode selection may be performed using a mode selection module 116. In at least one embodiment, the mode selection module 116 may include a rate distortion optimization (RDO) module 116A, although illustrated as a distinct therefrom. The mode selection may enable selection of parameters that may be associated with available ones of the encoding parameters. As such, mode selection for a prediction module 112 or for a transformation and quantization (T and Q) module 108 may be performed using an RDO output 124 of an RDO module 116A. In one example, an initial determination of modes to determine bit distribution and distortion of each mode may be performed in one or more of such modules. Then, evaluation of a metric may be performed by one or more of these modules to select from the initial determination of modes. For example, the metric may be a bitrate and a distortion associated with each of the modes. Mode selection may be performed from the modes initially determined based in part on minimization of the metric.

In at least one embodiment, inputs to the RDO module 116A may be in the form of QPs, as part of the mode selection process. A QP or residual coefficients may be provided in a complementary capacity with respect to bitrate for the encoding. The result of such mode selection is to provide specific encoding based in part on by the denoised frames used in the lookahead pass 118B of the coding tree 128. The mode selection can also allow determination of how many bits the encoder 104 is willing to sacrifice in order to conceal and/or eliminate a distortion that may be relevant to certain parts of media content, as supported by the denoising performed in the lookahead pass.

In at least one embodiment, there are trade-offs between bits used and distortion for the encoding performed. The trade-offs may be associated with distortion that may be different between different encoders. For example, the trade-offs may be between different user presets, different target bit rate (such as, possibly affecting a bit budget), and between different frames in a GoF, representing an input sequence 102, to be encoded. However, with the denoised lookahead pass of the coding tree, the trade-offs may be less so as useful information is preserved during encoding with the noise removed from consideration a mode for the encoding.

As part of the encoding parameters in an encoder 104, such as in H.264, a Fourier or other related transform may be performed on blocks within every frame to convert data therein to a frequency domain and to allow quantization or discarding of information based on select frequencies. In one example, this transform and quantization may be provided by or performed in a T and Q module 108. In doing so, transform coefficients at lower frequencies may be less aggressively quantized than those of higher frequency. Separately, motion estimation may be performed in the motion process module 118. The motion estimation may be used to capture and encode movements across video frames. While all such approaches or options attempt to improve video compression, they may all serve a similar goal to allow an encoder to compress video into smaller bitstreams by eliminating noise, artifacts, allowing at least more intensive motion estimation and exploiting temporal and spatial redundancy. However, as used herein, a coding tree-based adaptive quantization can cause distribution or retention of bits only to certain parts of a video sequence having the least noise or having no noise, for instance.

In view of all such benefits, encoders may differ based in part on selections of proper tool(s) to enable aspects thereof to provide economy of bits. For example, the selections of proper tools is in reference to selection of encoding parameters to enable selection of areas (such as provided by MBs) within frames of each input sequence 102 that are subject to more or less compression than other areas. This and other such approaches that may be defined within the encoder as different modes that may require more or less bits to ensure a desired quality. An RDO module 116A may be associated with a mode selection module 116 of an encoder 104 to address requirements by the use of RDO metrics, such as Sum of Squared Errors (SSE) or Sum of Transformed Differences (SATD) to determine a cost associated with each selection made and to enable a selection based on the cost. However, such metrics may be beneficially updated based in part on the adaptive QPs provided using the coding tree 128 of the motion process module 118.

Further RDO metrics allow further mode selection that benefit from evaluation using further quality measures, including VMAF, SSIM, MS-SSIM, or PSNR. However, in addition, at least addressing of temporal noise can be performed for the encoder 104 based on an output of the coding tree 128. Separately, for the encoder 104, distortion may be determined as a difference from the original image. In at least one embodiment, the system 100 for video compression herein can enable improved selection of at least those quality measures that may be a basis for the mode selection provided by an RDO output 124 of the RDO module 116A. The improved selection of at least the quality measures may be used by the encoder 104 to perform the video compression for video sequences 102 and, in particular, to provide the video compression that can surpass other measures of gains described throughout herein. For example, the encoder 104 (also referred to herein as a video encoder) can receive transform coefficients or parameters, such as QPs from the coding tree-based adaptive quantization. The RDO module 116A operates to optimize, for each point or block of a frame, an efficient representation that may include segmentation, prediction modes, motion vectors (MVs), or the QPs.

In at least one embodiment, use of the RDO output 124 is to make a selection of a mode, as provided by the RDO module 116A. The RDO also contributes to the encoding parameters available to be selected based in part on the coding tree-based adaptive quantization for input sequences 102. In at least one embodiment, an interface may be provided in association with the encoder 104 and the temporal filter 130 to allow input to be received in the temporal filter 130 or the encoder 104. The input may be to change aspects of the temporal filter 104 or the use of the denoising in the encoder 104. Further, the interface can enable outputs to the encoder 104 or the temporal filter 130, which may be able to cause selection of certain video compression parameters for compression of input sequences 102. The video compression parameters reflect quality measures of the RDO output 124 that may have different influences by the coding tree-based adaptive quantization herein, for instance.

In at least one embodiment, an RDO may be limited to a single point for each block in each frame of an input sequence 102 and may be represented by a linear equation of $R+\lambda*D$, where $\lambda$ (lambda) is a multiplier and where an (R, D) pair may be used with the multiplier to minimize a combined R+D value. R may be associated with a bit rate and D may be associated with distortion as it pertains to quality of the media. The RDO allows ranking, for instance, of candidate solutions using the linear equation to select one of the candidate solutions. Therefore, the lambda value may be associated with a range from 1 to a minimized cost for the set of (R, D). R may be measured in bits and D may be a quality unit, such that the equation provides a measure of units of distortion for every bit of a bit rate used in a video compression process. As described all throughout herein, however, the RDO output 124 may be affected by the coding tree-based adaptive quantization to enable one or more of mode selection or motion estimation so as to reduce an effect of noise in the video encoding. In one example, noise may pass through the video encoding by improper QPs causing mode selection and motion estimation that may not be optimal. Further, the noise may propagate from the individual video blocks towards the prediction of the at least one frame.

To achieve a predetermined bit rate of R, a certain value of lambda may be used. The coding tree 128 herein enables selection of encoding parameters that may include R, D, and lambda values to allow the RDO to use different quality measures based in part on denoising performed for the lookahead pass. This is performed to ensure that an effect of the video compression performed in the video encoder is based at least in part on less or no noise associated with at least certain frames of the underlying video content of the media stream represented by the input sequence 102. In at least one embodiment, therefore, the system 100 herein uses the coding tree 128 to optimize an encoder 104 so that different quality measures, representing different video compression parameters, may be used to efficiently distribute bits for compression purposes.

In at least one embodiment, the encoder 104 that is subject to H.264 encoding includes modules in hardware or software, such as a prediction module 112, the T and Q module 108, and an entropy coding module 110. There may be further modules, such as an inverse module 114, a filter module 120, a motion process module 118 (to support motion estimation and related aspects of the coding tree-based adaptive quantization herein), and a prior or reference frames module 106. As used herein, the prior or reference frames module 106 may include future frames subject to the lookahead pass and may include other frames for the main pass of the coding tree 128. The video compression herein does not have effect on a decoding process for a bitstream provided from the encoder 104 that includes the output sequence 122. For example, the decoding process may be according to the H.264 decoding or other decoding relevant to the encoding format used to provide the output bitstream 126 from the encoder 104 and, particularly, as to the entropy coding module 110.

A bitstream of frames, representing the input sequence 102 to be compressed may include different MBs. In at least one embodiment, different sizes of MBs may be supported in the encoder 104, including but not limited to 8×8, 8×16, 16×8, 4×4, and 16×16. The MBs likely correspond to displayed pixel data obtained at the location of the blocks. The prediction module 112 can generate a prediction MB that can be used to generate residual data reflective of data subject to quantization, as part of the video compression. There may be multiple prediction options associated with a prediction module 112, including intra prediction that is associated with previously encoded data that is from a current sequence, such as the input sequence 102. Another option associated with a prediction module 112 includes inter prediction that uses encoded data from other previously encoded frames, namely reference frames, such as from the prior or reference frames module 106. These reference frames can appear before or after the current frame, in the display order and may be associated with motion compensation, such as motion process module 118 that uses previously coded frames, such as provided from the prior or reference frames module 106.

Yet another option associated with a prediction module 112 includes the use of different prediction block sizes that is available to both, the intra prediction and inter prediction options. The use of different prediction block sizes of the MBs can change an accuracy associated with the predictions. A further option associated with a prediction module 112 includes the use of multiple frames during prediction, which is available in the inter prediction option to provide better accuracy in the predictions. A still further option is to skip MB data or residual data so that the encoder 104 itself performs an inference of the MB data based in part on the prediction MB. One or more of such options represent encoding parameters that may be applied to compress an input sequence 102 of a media stream based in part on a coding tree-based adaptive quantization.

In at least one embodiment, intra prediction may be based at least in part on spatial data within at least one frame of an input sequence 102. MBs generated as part of the intra prediction may be distinct from the MBs of the frame of the input sequence 102. Residual data may be residual MBs generated by a subtraction of the prediction MB, from a current MB. The residual MB can be subject to transformation, quantization, and entropy coding in the provided modules 108, 110 depending on a mode selected by a mode selection module 116 and that may be associated with the RDO module 116A to perform the RDO, for instance. Further, in the encoder 104, quantized data may be re-scaled and inverse transformed in the inverse module 114. An output of the inverse module 114 may be filtered and combined with the prediction MB in the prediction module 112. Motion estimation from the motion process module 118 may be included. The result may be a reconstructed MB or decoded frames that is provided to the prior or reference frames module 106 for further predictions. In at least one embodiment, the use of one or more of inter prediction or intra prediction represent additional encoding parameters that may be applied to compress an input sequence 102 of a media stream, based in part on the coding tree-based adaptive quantization.

While illustrated in the singular, the encoding performed by the encoder 104 is to an input sequence or set of scenes that are all indicated as having noise subject to coding tree-based adaptive quantization. The encoding performed is to provide an output bitstream that is an encoded media stream having different video sequences that are associated with different encoding parameters as determined using the coding tree-based adaptive quantization herein. In at least one embodiment, the encoder 104 may be based in part on one of an H.264 standard, an MPEG2 standard, an AVC standard, an HEVC standard, a VP9 standard, an AV1 standard, or a VVC standard. However, the encoder 104 may be any encoder standard that allows weighting input, such as by mode selection using a QP.

Figure 2:
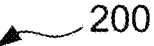
FIG. 2 is an illustration of aspects of improving compression using a coding tree-based adaptive quantization, in at least one embodiment.

FIG. 2 is an illustration of aspects 200 of improving compression using a coding tree-based adaptive quantization, in at least one embodiment. In at least one embodiment, an application 204 such as a media application, may provide the input sequence 102 for compression to an encoder 104. Such an input sequence 102 may be also provided to a temporal filter 130 for determining noise associated with at least certain frames that may be future frames in the input sequence, relative to current frames of the input sequence 102 undergoing compression in the encoder 104.

In at least one embodiment, one or more of the temporal filter or the coding tree may be part of a driver that is different from an encoder 104. The driver may be part of an application programming interface (API), a low-level hardware driver, or a microcode. Whereas the encoder 104 may be a software or hardware engine that performs the encoding according to an encoding standard. Therefore, in at least one embodiment, the driver may be adapted to receive at least part of the media stream having the input sequence 102. The driver be adapted to provide a lookahead output to the video encoder 104. The video encoder can provide an output bitstream 126 that has an output sequence 122 and that is based in part on the lookahead output.

The output bitstream 126 may include a compression of the media stream and may include the bit rate savings that is obtained by performing the lookahead using the denoised frames from the denoising 206 input. In one example, the bit rate savings is over a threshold that is associated with a reference compression that only has the main pass performed on the media stream and that is devoid of the lookahead pass or that is devoid of the denoised frame(s) in the lookahead pass. In at least one embodiment, an output of the coding tree is to enable at least one mode selection decision for compression of the media stream. This may be based in part on the effect of noise in the motion estimation or mode selection of the video encoding herein.

Therefore, it is possible to perform the temporal filter 130 and the coding tree 128 by separate features of the video encoder or by separate features associated with the video encoder 104. Then, an output that is LPoutput or Mpoutput of the coding tree 128 can be used to enable mode selection using the RDO feature of the video encoder. However, in at least one embodiment, the lookahead pass may be used to generate statistics regarding one or more frames. The statistics may be accessed by the main pass and may be used to modify the output of the main pass. In at least one embodiment, the modification of the output of the main pass is to provide QPs that enable a reduction in an effect of noise of one or more of motion estimation or mode selection.

In at least one embodiment, an application 204, which may be the same media application or a different application, may be used to configure one or more of the encoder 104 or the temporal filter 130. As described with respect to FIG. 1, there may be an interface provided in association with the encoder 104 and the temporal filter 130 to allow input to be received in the temporal filter 130 or the encoder 104. The application may provide such an input as a control input 208. The control input 208 may be to change aspects of the temporal filter 104 or the use of the denoising in the encoder 104. Further, the interface can enable outputs to the encoder 104 or the temporal filter 130, which may be able to cause selection of certain video compression parameters for compression of input sequences 102. In one example, instead of the input sequence 102, as-is, a processed version of the input sequence, such as a processed sequence 202 may be used with one or more the encoder 104 or the temporal filter 130. For example, a downsampled version of the input sequence 102 may be used with at least the temporal filter to determine temporal noise to be denoised 206 in lookahead pass 118B of the coding tree 128.

In at least one embodiment, the coding tree 128 may be associated with the lookahead pass 118B to receive information for denoising 206 for use with certain ones of the frames of the input sequence 102. The denoising 206 may be provided by a reference frame denoising that is associated with a reference frame from a GoF that includes the at least one frame subject to the lookahead pass 118B. The lookahead pass 118B may process its frames in parallel with the main pass 118A, although there may be different frames processed by each of the main pass and the lookahead pass. For example, the lookahead pass 118B processes certain future frames of the input sequence 102, relative to those frames being processed by the main pass 118A. However, all such frames may be part of a GoF. Further, the lookahead pass 118B may not incorporate complexities associated with the main pass 118A. For example, the lookahead pass 118B may not include block partitioning choices in the manner of the main pass 118A. The lookahead pass 118B may be configured to operate with a fixed block size. In H.264, this fixed block size may be a 16×16 block size, although the application and interface herein may be used to configure other block sizes.

Further, the lookahead pass 118B may be also performed on a downsampled version of the input sequence 102, as provided by the processed sequence 202. The processed sequence may have a downsampled size for the frames, with different width, height, and resolution than the input sequence 102. In addition, the coding tree 128 herein can provide motion estimation for the fixed block size and can provide inter residuals. Also, it is possible to use the coding tree 128 to provide intra prediction and intra residuals, as well. In at least one embodiment, the output of the coding tree main be separate or combined from the passes 118A, 118B. For example, the LPoutput and the MPoutput may include parameters associated with QPs for the mode selection or motion estimation. However, it is possible to use to LPoutput to adjust the MPoutput and to use the adjusted MPoutput for mode selection. In addition, it is also possible to activate or deactivate the lookahead pass 118B for different input sequences or different media streams, in at least one embodiment.

FIG. 3 is an illustration of aspects 300 of improving compression using a coding tree-based adaptive quantization, in at least one embodiment. The input sequence 102 may include a GoF of current or reference frames and of future frames. Different ones of the frames 102A, 102B may be used for the main pass and the lookahead pass. For example, the lookahead pass 118B uses future frames 102B that are far ahead, relative to the frames 102A used for the main pass. Further, the future frames 102B may be subject to denoising 206 prior to use in the lookahead pass 118B, relative to frames 102A of the main pass 118A. However, in at least one embodiment, the main pass 118A may be also subject to denoising 206. In at least one embodiment, the coding tree 128 may be a weighted graph of interdependencies between the frames 102A, 102B, wherein the interdependencies are devoid of at least a predetermined noise in at least the lookahead pass. The predetermined noise may be enabled by the temporal filter, including by training a machine learning (ML) model with features of various frames or by different types of noise so that the ML model can determine temporal noise in provided frames. However, in at least one embodiment, it is possible to provide configuration to the temporal filter to enable filtering of certain types of noise from the frames.

In one example, a block that is a future frame and that has noise may be taken up by the temporal filter and may be denoised. A block, such as a MB may be determined to be important, relative to other blocks, at least because of a number of interdependencies from the block that may be used to predict other blocks with a low residual. In at least one embodiment, at least intra prediction and inter prediction may be incorporated into determinizing the interdependencies from the blocks 306, 308. However, the blocks 306 of the main pass may or may not include a noise 302 aspect, whereas the blocks 308 of the lookahead pass includes substantially denoised aspects, such as only including the intra prediction and inter prediction 304. For example, the coding tree herein may include a function to determine statistics that may be reflective of an importance of a block with respect to motion estimation from one or more reference blocks. This importance may be provided as a propagation value in the statistics to reflect the amount of contribution of the motion estimation that propagates between frames or blocks. The propagation value may be an absolute value. The propagation may increase or decrease along with an inter residual and an intra residual.

In at least one embodiment, the interdependencies may also include intra residuals from vertices of a frame, which may be assigned respective weights. For example, for a block 306; 308 that may not be referenced by other frames of the GoF, each of the vertices without an outgoing edge may be used as an initial point to determine interdependencies. With all blocks of each vertex having assigned weights, the weights may be accumulated, by a product thereof, along with their respective propagation value and any weights assigned to connecting edges if the blocks have a connecting edge. The vertices themselves might have weights that are a sum of all resulting weights that may be accumulated and with any intra residuals left over.

Such a determination of interdependencies may be performed for all blocks of all unreferenced frames of a GoF, such as all B-frames in a GoF, for at least the lookahead pass 118B. Further, the interdependencies may be developed by traversing backwards from one frame that may be the farthest future frame and by traversing the frames of the GoF one at a time. Further, it may be beneficial to perform such determination for interdependencies using each frame that has all its reference frames processed. Further, the QP deltas for a block 306; 308 may be determined to be part of the MPoutput or the LPoutput. This may be determined using at least a log of a ratio of the weights of the block to its intra residuals. In at least one embodiment, a call 310 ("stats call") for statistics may be made from the main pass and corresponding statistics 312 ("stats returned") may be returned. The corresponding statistics may be QPs or values related to QPs determined in the lookahead pass and that may be returned from the lookahead pass. These statistics returned from the lookahead pass may be used to modify QPs of the main pass that is reflected by the MPoutput. The MPoutput may be an output of the coding tree to enable the reduction in effect of noise with respect to motion estimation or mode selection performed during the encoding process.

Further, the QPs provided from the lookahead pass may be provided in the LPoutput for the main pass. The QPs for the lookahead pass may be determined for only a certain number of frames or for certain GoFs in an input sequence 102 that are ahead of the frames or the GoF being processed by the main pass. Further, the interdependencies may be determined dynamically in an on-going manner, every time the main pass has finished encoding a GoF. Therefore, the QP obtained may be for a future GoF or frames relative to the main pass. In at least one embodiment, the main pass may include processing of frames only to adjust weights for the GoF of the lookahead pass.

In at least one embodiment, the determination of the interdependencies may be performed for any of the encoding standards used. However, the encoding standards may have different block structure as discussed with respect to at least FIG. 1. For instance, AVC standards may include dividing frames into 16×16 MBs. These frames may be further divided into 8×8, 16×8, or 8×16 sub-MBs. However, only some of the sub-MBs may be available for inter-coding and can be further divided into sub-MBs of 4×4 sizes. Therefore, the coding tree 128 herein can make use of such subdivisions to provide interdependencies that are structured as trees of blocks, such as MBs or coding blocks.

For example, different than AVC, HEVC standards may include a different block structure and may provide a different tree structure, which is referred to as a coding tree units (CTUs), which is generalized herein as coding blocks to be part of a coding tree 128. For example, the coding blocks may be assigned to input sequences as a whole. The coding blocks may be sizes 16×16, 32×32 or 64×64. The coding tree 128 for HVEC standards may be referred to as a quadtree structure at least because of the power of two sizing used. Further, the sizes may be split into squares of equal but smaller sizes and each of the smaller sizes can also be split further. The coding tree 128 in the HVEC standard may have blocks of up to 8×8.

Further, in the HVEC standard, the blocks may be divided into independent blocks that are each a prediction unit (PU). The PU may be a block having prediction information and having transform coefficients. Then, intra-predicted PUs may be a same size as the blocks. However, in some cases the intra-predicted Pus may be of still smaller sizes relative to the 8×8 blocks, such as 4×4 PUs. The blocks in the HVEC standard may include prediction and residual data and may be used as a coding tree to determine interdependencies for the dual passes as described with AVC and H.264 above.

In at least one embodiment, the temporal filter to perform the denoising represents a reprocessing that may be performed outside encoder, prior to encoding, or that may be part of the video encoding and may be performed during the encoding. Further, the lookahead pass may be used for accumulation of statistics associated with frames of the input sequence 102. For example, the lookahead pass may be used to generate QPs or statistics related to the QPs for future frames, which may be called from the main pass and which may be used to modify QPs of the main pass.

Figure 4:
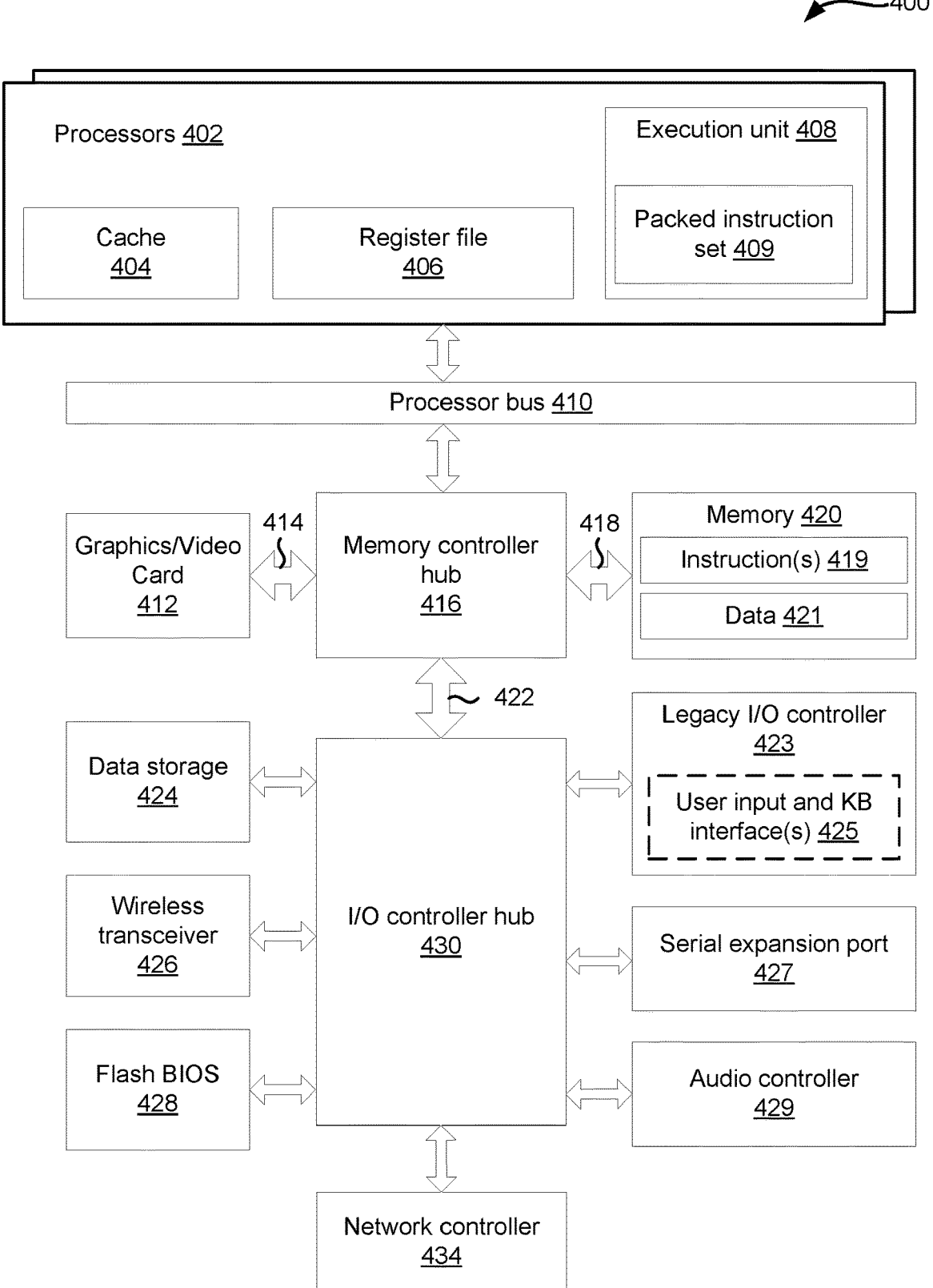
FIG. 4 illustrates computer and processor aspects of a system for improving compression using a coding tree-based adaptive quantization, in at least one embodiment.

FIG. 4 illustrates computer and processor aspects 400 of a system for improving compression using a coding tree-based adaptive quantization, in at least one embodiment. For example, each of the illustrated processors 402 may include one or more processing or execution units 408 that can perform any or all of the aspects of the system 100 for improving compression using a coding tree-based adaptive quantization. The system 100 may include an interface that may be between the encoder and the temporal filter, in at least one embodiment, to allow changes to aspects of the temporal filter 104 or the use of the denoising in the encoder 104.

The processing or execution units 408 may include multiple circuits to support the aspects described herein for one or more of the encoder 104, the temporal filter 130, and the interface between these two aspects. In at least one embodiment, the processors 402 may include CPUs, GPUs, DPUs that may be associated with a multi-tenant environment to perform one or more of the encoder 104, the temporal filter 130, and the interface between these two aspects described herein. Further, the GPUs may be distinctly in distinct graphics/video cards 412, relative to a DPU (represented by a network controller 434) and a CPU represented by the processors 402 illustrated in FIG. 4. Therefore, even though described in the singular, the graphics/video card 412 may include multiple cards and may include multiple GPUs on each card.

The computer and processor aspects 400 may be performed by one or more processors 402 that include a system-on-a-chip (SOC) or some combination thereof formed with a processor that may include execution units to execute an instruction, according to at least one embodiment. In at least one embodiment, the computer and processor aspects 400 may include, without limitation, a component, such as a processor 402 to employ execution units 408 including logic to perform algorithms for process data, in accordance with present disclosure, such as in embodiment described herein. In at least one embodiment, the computer and processor aspects 400 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, the computer and processor aspects 400 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, the computer and processor aspects 400 may include, without limitation, a processor 402 that may include, without limitation, one or more execution units 408 to perform aspects according to techniques described with respect to at least one or more of FIGS. 1-3 and 5-7 herein. In at least one embodiment, the computer and processor aspects 400 is a single processor desktop or server system, but in another embodiment, the computer and processor aspects 400 may be a multiprocessor system.

In at least one embodiment, the processor 402 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, a processor 402 may be coupled to a processor bus 410 that may transmit data signals between processors 402 and other components in computer and processor aspects 400.

In at least one embodiment, a processor 402 may include, without limitation, a Level 1 ("L1") internal cache memory ("cache") 404. In at least one embodiment, a processor 402 may have a single internal cache or multiple levels of internal cache. In at least one embodiment, cache memory may reside external to a processor 402. Other embodiments may also include a combination of both internal and external caches depending on particular implementation and needs. In at least one embodiment, a register file 406 may store different types of data in various registers including, without limitation, integer registers, floating point registers, status registers, and an instruction pointer register.

In at least one embodiment, an execution unit 408, including, without limitation, logic to perform integer and floating point operations, also resides in a processor 402. In at least one embodiment, a processor 402 may also include a microcode ("ucode") read only memory ("ROM") that stores microcode for certain macro instructions. In at least one embodiment, an execution unit 408 may include logic to handle a packed instruction set 409.

In at least one embodiment, by including a packed instruction set 409 in an instruction set of a general-purpose processor, along with associated circuitry to execute instructions, operations used by many multimedia applications may be performed using packed data in a processor 402. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, an execution unit 408 may also be used in microcontrollers, embedded processors, graphics devices, DSPs, and other types of logic circuits. In at least one embodiment, the computer and processor aspects 400 may include, without limitation, a memory 420. In at least one embodiment, a memory 420 may be a Dynamic Random Access Memory ("DRAM") device, a Static Random Access Memory ("SRAM") device, a flash memory device, or another memory device. In at least one embodiment, a memory 420 may store instruction(s) 419 and/or data 421 represented by data signals that may be executed by a processor 402.

In at least one embodiment, a system logic chip may be coupled to a processor bus 410 and a memory 420. In at least one embodiment, a system logic chip may include, without limitation, a memory controller hub ("MCH") 416, and processors 402 may communicate with MCH 416 via processor bus 410. In at least one embodiment, an MCH 416 may provide a high bandwidth memory path 418 to a memory 420 for instruction and data storage and for storage of graphics commands, data, and textures. In at least one embodiment, an MCH 416 may direct data signals between a processor 402, a memory 420, and other components in the computer and processor aspects 400 and to bridge data signals between a processor bus 410, a memory 420, and a system I/O interface 422. In at least one embodiment, a system logic chip may provide a graphics port for coupling to a graphics controller. In at least one embodiment, an MCH 416 may be coupled to a memory 420 through a high bandwidth memory path 418 and a graphics/video card 412 may be coupled to an MCH 416 through an Accelerated Graphics Port ("AGP") interconnect 414. In at least one embodiment, the graphics/video card 412 may be coupled to one or more of the processors 402 via a PCIe interconnect standard. Similarly, a network controller 424 may also be coupled to one or more of the processors 402 via a PCIe interconnect standard.

In at least one embodiment, the computer and processor aspects 400 may use a system I/O interface 422 as a proprietary hub interface bus to couple an MCH 416 to an I/O controller hub ("ICH") 430. In at least one embodiment, an ICH 430 may provide direct connections to some I/O devices via a local I/O bus. In at least one embodiment, a local I/O bus may include, without limitation, a high-speed I/O bus for connecting peripherals to a memory 420, a chipset, and processors 402. Examples may include, without limitation, an audio controller 429, a firmware hub ("flash BIOS") 428, a wireless transceiver 426, a data storage 424, a legacy I/O controller 423 containing user input and keyboard interface(s) 425, a serial expansion port 427, such as a Universal Serial Bus ("USB") port, and a network controller 434. In at least one embodiment, data storage 424 may comprise a hard disk drive, a floppy disk drive, a CD-ROM device, a flash memory device, or other mass storage device.

In at least one embodiment, FIG. 4 illustrates computer and processor aspects 400, which includes interconnected hardware devices or "chips", whereas in other embodiments, FIG. 4 may illustrate an exemplary SoC. In at least one embodiment, devices illustrated in FIG. 4 may be interconnected with proprietary interconnects, standardized interconnects (e.g., PCIe) or some combination thereof. In at least one embodiment, one or more components of the computer and processor aspects 400 that are interconnected using compute express link (CXL) interconnects.

Therefore, the at least one execution unit 408 may be a circuit of at least one processor 402 to be associated with a video encoder. The association may be such that the at least one execution unit 408 of at least one processor 402 can perform the video encoder. The association may be such that the at least one execution unit 408 of at least one processor 402 can load and run or execute instructions to perform the video encoder. However, the association may be such that the at least one execution unit 408 of at least one processor 402 may be hardwired to perform the video encoder.

Further, the at least one execution unit 408 may be a circuit of at least one processor 402 to be associated with a temporal filter and a coding tree. The one execution unit 408 may be used to perform a main pass for motion estimation of a media stream. The coding tree can enable motion estimation that propagates from individual MBs towards prediction of at least one frame associated with the media stream. The coding tree may be associated with a lookahead pass that operates in parallel with the main pass. The temporal filter can enable denoising within the lookahead pass. This is to reduce an effect of noise in the motion estimation that propagates from the individual MBs towards the prediction of the at least one frame.

In at least one embodiment, the at least one execution unit 408 may be such that denoising may be provided by keyframe denoising that is associated with a keyframe from a GoF that includes the at least one frame. Further, the temporal filter and the coding tree may be performed by separate features of the video encoder. An output of the coding tree can enable mode selection using the RDO feature of the video encoder. The mode selection, in turn, may be to additionally reduce the effect of the noise in the motion estimation that would otherwise propagate from the individual video blocks towards the prediction of the at least one frame. For example, the RDO feature provides its own optimization in addition to the optimization from the coding tree using at least a denoised frame or block in the lookahead pass.

In at least one embodiment, the at least one execution unit 408 may be able to perform the temporal filter using a ML model that is trained by features of different noise. Then, the ML model can infer noise between frames from a group of frames. The ML model may be used to provide the denoising for at least a frame of the lookahead pass based in part on the inference. Further, the temporal filter and the coding tree may be part of a driver that is different from the encoder. The driver may be part of an application programming interface (API), a low-level hardware driver, or a microcode. Whereas the encoder may be a hardware engine that performs the encoding according to an encoding standard.

Therefore, in at least one embodiment, the driver may be adapted to receive at least part of the media stream. The driver may be adapted to provide a lookahead output to the video encoder. The video encoder can provide an output bitstream that is based in part on the lookahead output. The output bitstream includes a compression of the media stream and includes the bit rate savings that is obtained by performing the lookahead using the denoised frames. In one example, the bit rate savings is over a threshold that is associated with a reference compression that only has the main pass performed on the media stream and that is devoid of the lookahead pass or that is devoid of the denoised frame(s) in the lookahead pass. In at least one embodiment, an output of the coding tree is to enable at least one mode selection decision for compression of the media stream. This may be based in part on the effect of noise in the motion estimation that propagates from the individual video blocks towards the prediction of the at least one frame.

Further, the at least one execution unit 408 may be a circuit of at least one processor 402 to be associated with an encoder to perform a compression of a media stream. The compression may be based in part of a main pass for motion estimation of the media stream and a lookahead pass supported by a coding tree and a temporal filter. The coding tree can enable motion estimation that propagates from individual MBs towards prediction of at least one frame associated with the media stream. The lookahead pass can operate in parallel with the main pass. The temporal filter can enable denoising within the lookahead pass to reduce an effect of noise in the motion estimation that propagates from the individual MBs towards the prediction of the at least one frame.

The at least one execution unit 408 may be such that the denoising is performed using a keyframe denoising that is associated with a keyframe from a GoF that includes the at least one frame. The at least one execution unit 408 may be such that the temporal filter and the coding tree thereof are performed by separate features of the video encoder. Then, an output of the coding tree can be used to enable mode selection using an RDO feature of the video encoder. The mode selection can additionally reduce the effect of the noise in the motion estimation that propagates from the individual video blocks towards the prediction of the at least one frame.

Figure 5:
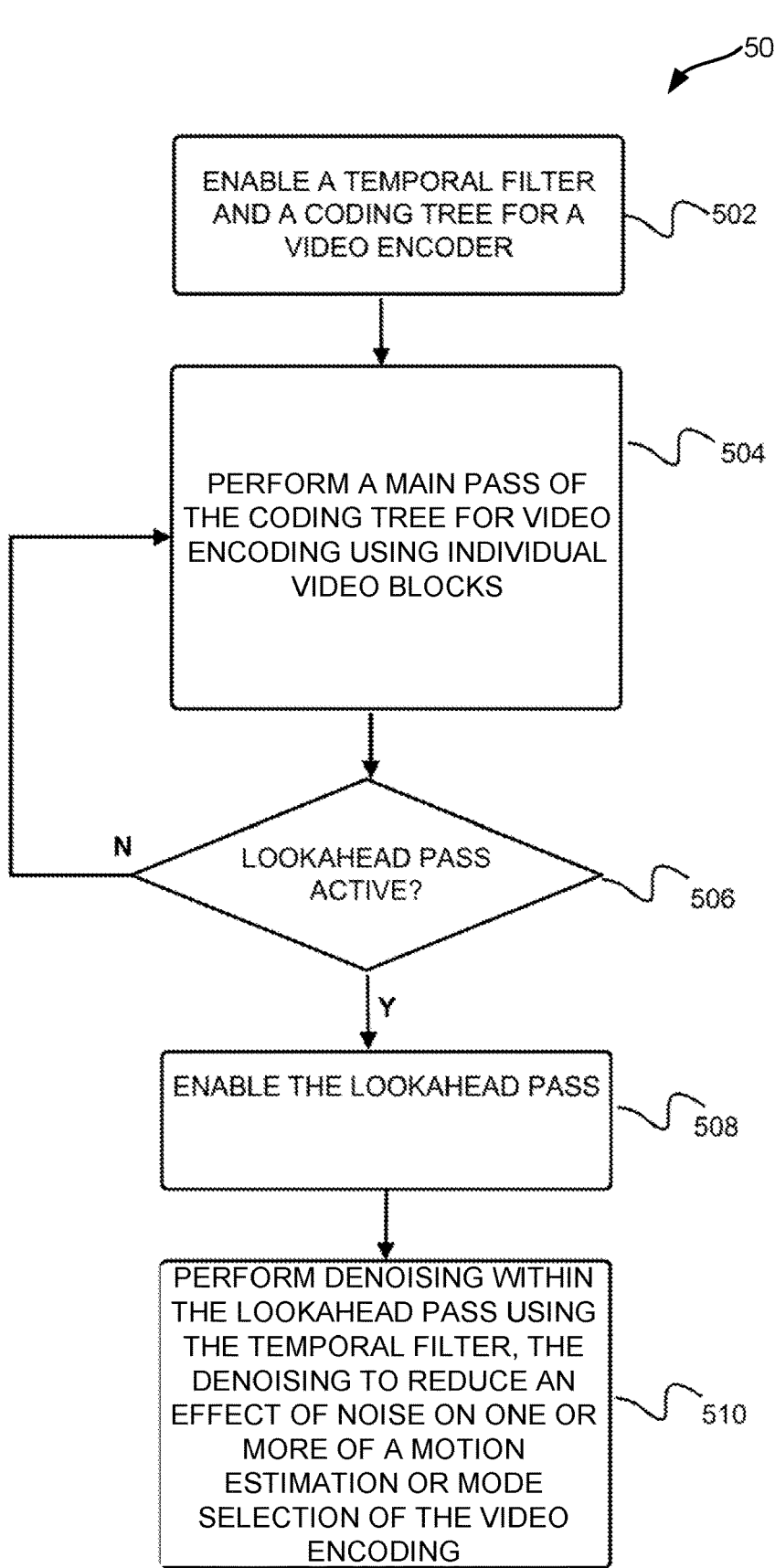
FIG. 5 illustrates a process flow for a system for improving compression using a coding tree-based adaptive quantization, in at least one embodiment.

FIG. 5 illustrates a process flow or method 500 for a system for improving compression using a coding tree-based adaptive quantization, in at least one embodiment. The method 500 may include enabling 502 a temporal filter and a coding tree for the video encoder. In one example, one or more of the temporal filter and the coding tree may be performed in a driver or separately from the encoder. Therefore, enabling the driver or separate feature to interface with the encoder may be part of step 502. However, providing the media stream to one or more inputs that is associated with the temporal filter and the coding tree of the video encoder may be part of the enabling 502 step of the method 500 herein. Alternatively, as the coding tree and the temporal filter may be activated distinctly from other aspects of the video encoder, the enabling 502 step may be simply to cause such activation or to ensure that the benefits realized by the system for improving compression using the temporal filter and the coding tree occur for a media stream provided to a video encoder, under step 502, for instance.

The method 500 may include performing 504 a main pass of the coding tree for video encoding using individual video blocks towards prediction of at least one frame associated with a media stream. As the coding tree includes a lookahead pass, a verification 506 may be performed to determine if the lookahead pass is active. In one example, however, the lookahead pass is always active and the verification 506 may be simply to ensure that aspects of the lookahead pass comply with its requirements. For example, a verification

506 may be performed to ensure that future frames of the input sequence are available for performing the lookahead pass. The method 500 may include enabling 508 the lookahead pass. In at least one embodiment, this step 508 may include operating the lookahead pass in parallel with the main pass. The method 500 may include performing 510 denoising within the lookahead pass using the temporal filter. Further, the denoising is to reduce an effect of noise in the video encoding performed by the main pass. For example, the denoising may be by providing statistics and QPs in the lookahead pass that may be called upon by the main pass and that may be used to modify QPs of the main pass. The modified QPs enable mode selection or motion estimation with reduced effect of noise in the video encoding.

Figure 6:
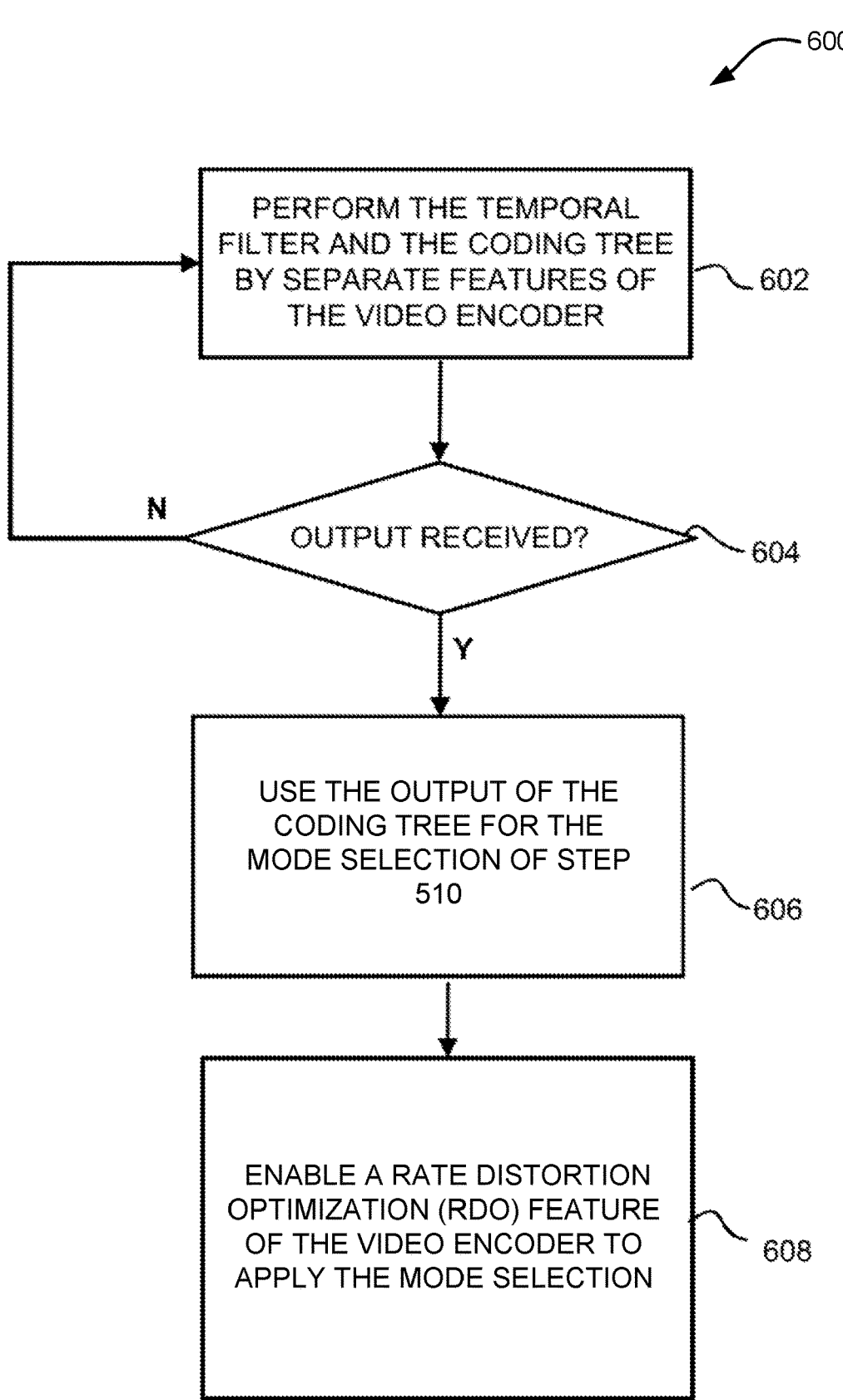
FIG. 6 illustrates yet another process flow for a system for improving compression using a coding tree-based adaptive quantization, in at least one embodiment.

FIG. 6 illustrates yet another process flow or method 600 for a system for improving compression using a coding tree-based adaptive quantization, in at least one embodiment. The method 600 may be used in conjunction with the method 500 of FIG. 5, in at least one embodiment. The method 600 in FIG. 6 may include performing 602 the temporal filter and the coding tree by separate features of the video encoder. This may be associated with the enabling 502 step of FIG. 5, for instance. The method 600 may include verifying 604 that an output is received of at least the coding tree. For instance, as the coding tree may include optional features of certain standards, the verification may be used to determine and activate certain ones of the features. In at least one example, the temporal filter may be optional as well. The method 600 herein is to ensure that the features required to provide the coding tree-based adaptive quantization are active. This may be so that an output of the coding tree is usable in the compression. The method 600 may include using 606 the output of the coding tree for mode selection in step 510 of the method 500 in FIG. 5. The method 600 may include enabling 608 the RDO feature of the video encoder to provide the mode selection that has the effect of the noise in the video encoding herein.

Figure 7:
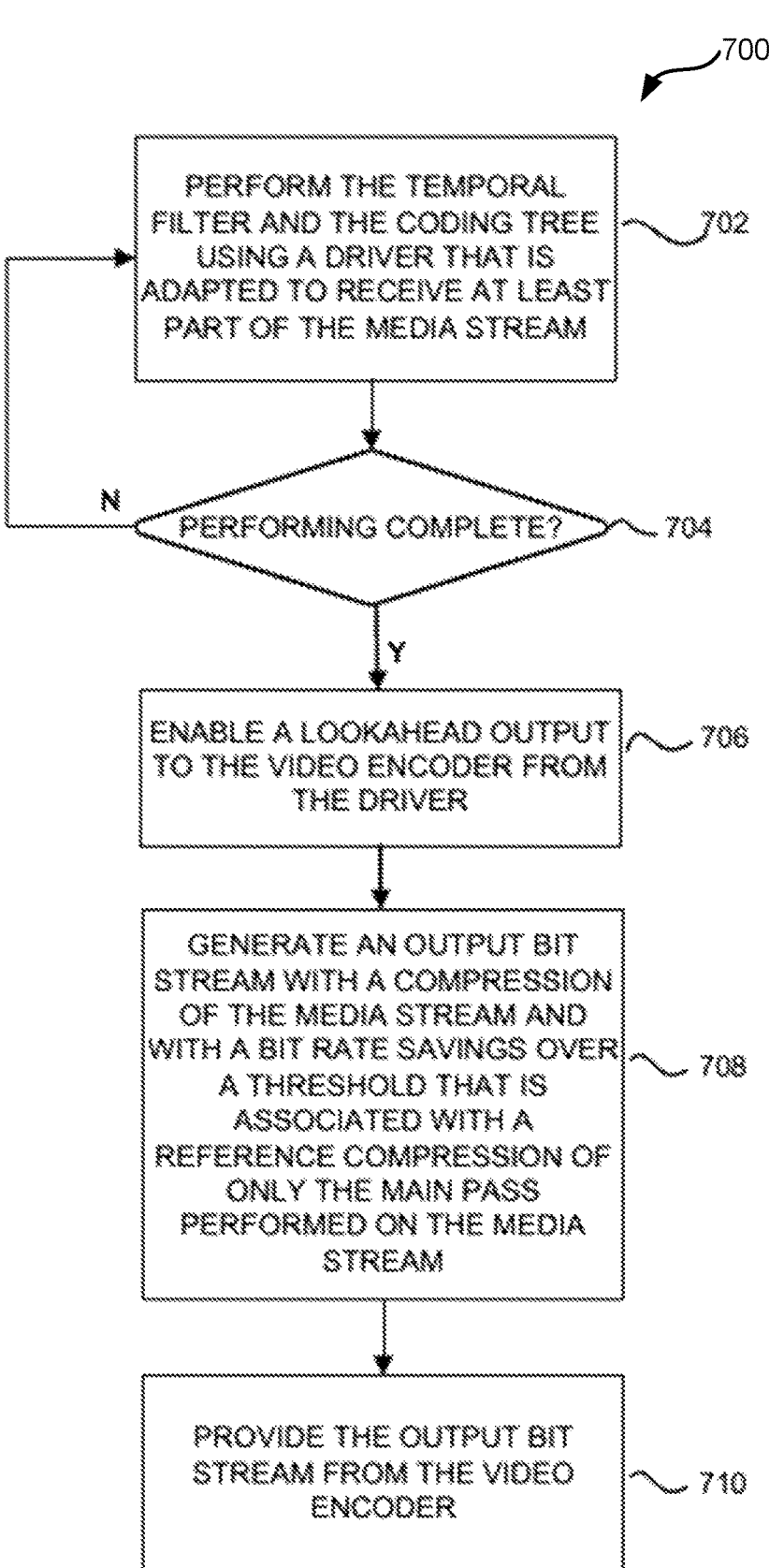
FIG. 7 illustrates a further process flow for improving compression using a coding tree-based adaptive quantization, in at least one embodiment.

FIG. 7 illustrates a further process flow or method 700 for improving compression using a coding tree-based adaptive quantization, in at least one embodiment. Like in the case of method 600, the method 700 of FIG. 7 may be used in conjunction with one or more of the methods 500, 600 of FIGS. 5 and 6, in at least one embodiment. The method 700 in FIG. 7 may include performing 702 the temporal filter and the coding tree using a driver that is adapted to receive at least part of the media stream. This may be associated with the enabling 502 step of FIG. 5, for instance. The method may include verifying 704 that the performing step is complete. This may be by ensuring that all future frames intended for at least an input sequence is processed using the temporal filter and the coding tree. The method 700 includes enabling 706 a lookahead output to the video encoder from the driver.

The method 700 may include generating 708 an output bitstream that includes a compression of the media stream and that includes a bit rate savings that is over a threshold. The output bitstream is based in part on the lookahead output. For example, the output bitstream includes compression by parameters selected to incorporate the reduced noise or removed noise in the motion estimation towards the prediction of the at least one frame, such as in step 510 of FIG. 5. Further, the threshold in step 708 may be associated with a reference compression that includes compression using only the main pass performed on the media stream. The method 700 may include providing 710 the output bitstream from the video encoder.

In at least one embodiment, one or more of the methods 500-700 herein may include using denoising that is a reference frame denoising. The reference frame denoising may be associated with a reference frame from a GoF that may be used in the lookahead pass and that includes the at least one frame subject also to the main pass. For example, the GoF may include at least one future frame that is part of an input sequence that includes that at least one frame that is processed by the main pass. Further, one or more of the methods 500-700 herein may include using an output of the coding tree to enable the mode selection to provide a decision for compression of the media stream. For example, the mode selection decision may be based in part on the reduction to the effect of the noise in the video encoding associated with the main pass of step 504.

In the following description, numerous specific details are set forth to provide a more thorough understanding of at least one embodiment. However, it will be apparent to one skilled in the art that the inventive concepts may be practiced without one or more of these specific details.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors.

In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. References may also be made to providing, outputting, transmitting, sending, or presenting analog or digital data. In at least one embodiment, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A video encoder to be associated with a temporal filter and a coding tree and to perform a main pass for video encoding using individual video blocks towards prediction of at least one frame associated with a media stream, wherein the coding tree is associated with a lookahead pass, and wherein the temporal filter is to enable denoising within the lookahead pass to reduce an effect of noise on one or more of a motion estimation or mode selection of the video encoding.

2. The video encoder of claim 1, wherein the denoising is a reference frame denoising that is associated with a reference frame from a group of frames (GoF) that includes the at least one frame.

3. The video encoder of claim 1, wherein the temporal filter and the coding tree are performed by separate features of the video encoder and wherein an output of the coding tree enables the mode selection using a rate distortion optimization (RDO) feature of the video encoder.

4. The video encoder of claim 1, wherein the temporal filter and the coding tree are part of a driver that is adapted to receive at least part of the media stream and that is adapted to provide a lookahead output to the video encoder, the video encoder to provide an output bitstream that is based in part on the lookahead output and that is a compression of the media stream, the output bitstream comprising a bit rate savings over a threshold that is associated with a reference compression comprising only the main pass performed on the media stream.

5. The video encoder of claim 1, wherein an output of the coding tree is to enable the mode selection to provide a decision for compression of the media stream based in part on the reduction to the effect of the noise in the video encoding associated with the main pass.

6. The video encoder of claim 1, wherein the video encoder is adapted for H.264, HEVC, and AV1 encoding, wherein the coding tree is a macroblock (MB) tree or a coding unit (CU) tree, superblock (SB) tree and wherein the individual video blocks are individual macroblocks (MBs) or individual coding units (CUs).

7. A system comprising:
   one or more processing units to be associated with a temporal filter and a coding tree and to perform a main pass for video encoding using individual video blocks towards prediction of at least one frame associated with a media stream, wherein the coding tree is associated with a lookahead pass, and wherein the temporal filter is to enable denoising within the lookahead pass to reduce an effect of noise on one or more of a motion estimation or mode selection of the video encoding.

8. The system of claim 7, wherein the denoising is a reference frame denoising that is associated with a reference frame from a group of frames (GoF) that includes the at least one frame.

9. The system of claim 7, wherein the temporal filter and the coding tree are performed by separate features of the video encoder and wherein an output of the coding tree enables the mode selection using a rate distortion optimization (RDO) feature of the video encoder.

10. The system of claim 7, wherein the temporal filter uses an inference of the noise between frames from a group of frames (GoF) and provides the denoising based in part on the inference.

11. The system of claim 7, wherein the temporal filter and the coding tree are part of a driver that is adapted to receive at least part of the media stream and that is adapted to provide a lookahead output to the video encoder, the video encoder to provide an output bitstream that is based in part on the lookahead output and that is a compression of the media stream, the output bitstream comprising a bit rate savings over a threshold that is associated with a reference compression comprising only the main pass performed on the media stream.

12. The system of claim 11, wherein an output of the coding tree is to enable the mode selection to provide a decision for compression of the media stream based in part on the reduction to the effect of the noise in the video encoding associated with the main pass.

13. A system comprising:
   one or more processing units to perform a compression of a media stream based in part on a main pass for video encoding using individual video blocks towards prediction of at least one frame associated with the media stream and based in part on a lookahead pass that is associated with a coding tree and a temporal filter, the temporal filter to enable denoising within the lookahead pass to reduce an effect of noise on one or more of a motion estimation or mode selection of the video encoding.

14. The system of claim 13, wherein the denoising is a reference frame denoising that is associated with a reference frame from a group of frames that includes the at least one frame.

15. The system of claim 13, wherein the temporal filter and the coding tree are performed by separate features of the video encoder and wherein an output of the coding tree enables the mode selection using a rate distortion optimization (RDO) feature of the video encoder.

16. A method for a video encoder, the method comprising:
enabling a temporal filter and a coding tree for the video encoder;
performing a main pass of the coding tree for video encoding, using individual video blocks, towards prediction of at least one frame associated with a media stream;
enabling a lookahead pass that is associated with the coding tree; and
performing denoising within the lookahead pass using the temporal filter, the denoising to reduce an effect of noise on one or more of a motion estimation or mode selection of the video encoding.

17. The method of claim 16, further comprising:
performing the temporal filter and the coding tree by separate features of the video encoder; and using an output of the coding tree for the mode selection by a rate distortion optimization (RDO) feature of the video encoder.

18. The method of claim 16, further comprising:
performing the temporal filter and the coding tree using a driver that is adapted to receive at least part of the media stream;
enabling a lookahead output to the video encoder from the driver; and
providing an output bitstream from the video encoder based in part on the lookahead output, the output bitstream to comprise a compression of the media stream and to comprise a bit rate savings over a threshold that is associated with a reference compression comprising only the main pass performed on the media stream.

19. The method of claim 16, wherein the denoising is a reference frame denoising that is associated with a reference frame from a group of frames (GoF) that includes the at least one frame.

20. The method of claim 16, wherein an output of the coding tree is to enable the mode selection to provide a decision for compression of the media stream based in part on the reduction to the effect of the noise in the video encoding associated with the main pass.

* * * * *